Aug. 23, 1932.  R. RAPEIN  1,873,216
AMUSEMENT APPARATUS
Filed May 11, 1931  2 Sheets-Sheet 1

Aug. 23, 1932.　　　　R. RAPEIN　　　　1,873,216
AMUSEMENT APPARATUS
Filed May 11, 1931　　2 Sheets-Sheet 2

R. Rapein
INVENTOR
By
ATTYS.

Patented Aug. 23, 1932                                                    1,873,216

UNITED STATES PATENT OFFICE

ROBERT RAPEIN, OF CHEMAZE, MAYENNE, FRANCE, ASSIGNOR TO SOCIÉTÉ À RESPONSA-BILITÉ LIMITÉE: CONSORTIUM GENERAL DE L'INDUSTRIE FORAINE, OF PARIS, FRANCE

AMUSEMENT APPARATUS

Application filed May 11, 1931, Serial No. 536,601, and in France December 26, 1930.

This invention relates to amusement apparatus in which movable objects arranged for receiving passengers are driven for moving at a definite speed, although it may be variable, on definite paths.

The invention has for main object to provide an amusement apparatus of this kind comprising several groups of movable objects, each group of movable objects having a path different from the other groups, and in which, moreover, these paths are arranged for intersecting each other, the movements of the various groups of movable objects being rendered dependent on each other so that, although the paths intersect, there is no risk of collision between movable objects belonging to distinct groups, the movable objects of one of the groups passing, at the time they cross the paths, between two successive movable objects of the other group.

The speed at which the movable objects can be caused to move, without there being any danger, gives to the passengers the very distinct impression, when crossing the trajectories, that collisions are unavoidable. The surprise resulting from this impression constitutes the main interest of this new amusement apparatus.

The accompanying drawings illustrate, by way of example only, a form of carrying out the invention.

Figure 1:
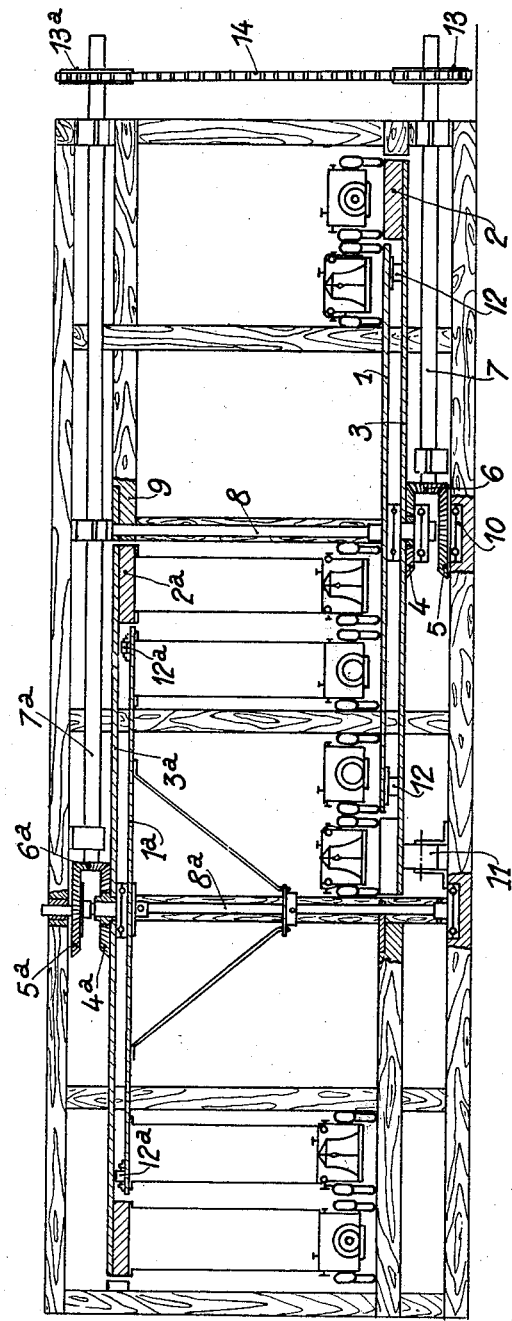
Figure 2:
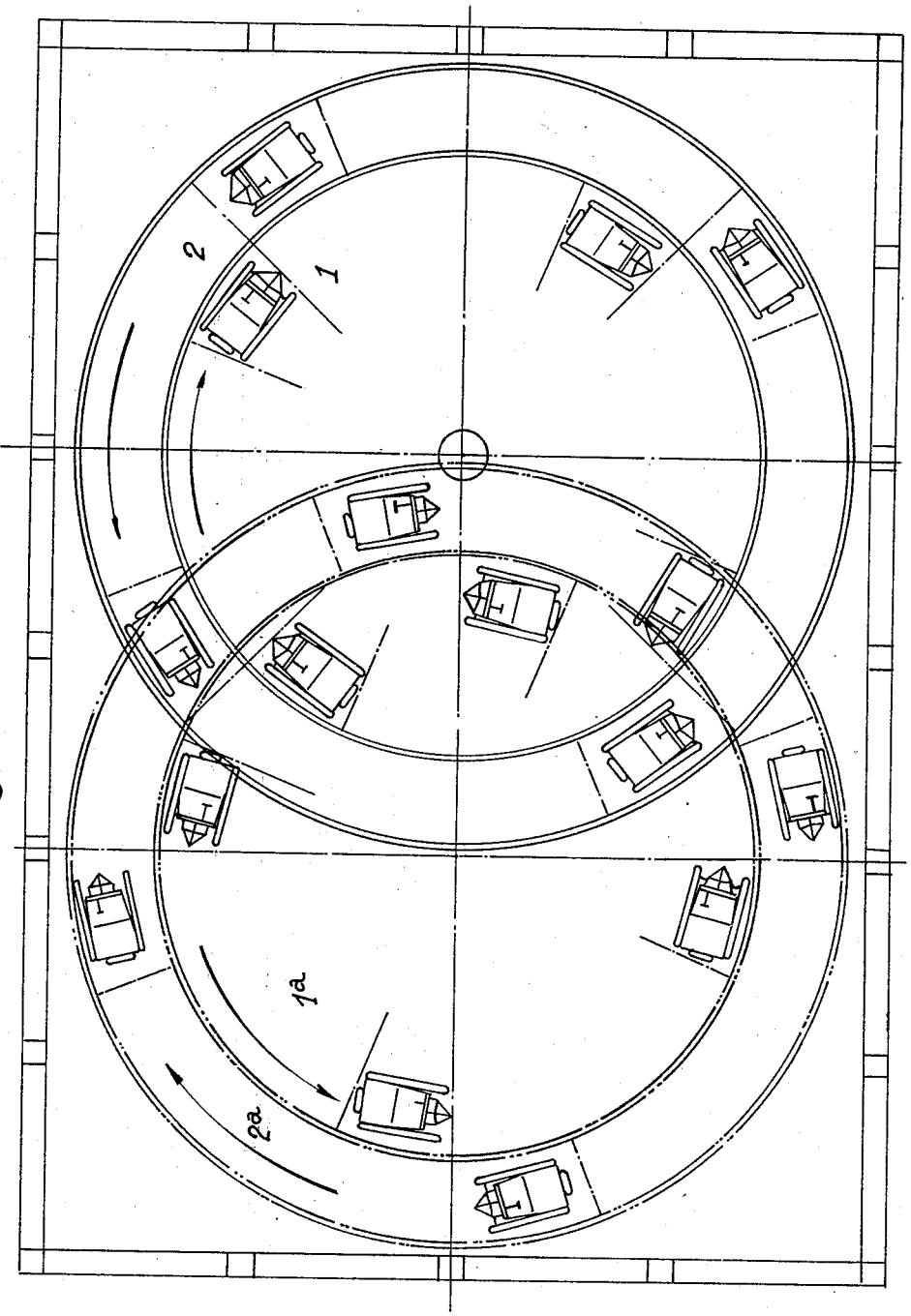

Fig. 1 is an elevation and section.
Fig. 2 is a plan view thereof.

In this example, the amusement apparatus is constituted by four groups of movable objects having a circular path; these groups are associated in order that the paths be concentric per pair.

The right-hand portion of this roundabout is composed of a circular plate 1 and of a concentric crown 2 arranged at the same level as the said plate 1 and supported by a plate 3 arranged underneath the preceding one.

On the plate 1 are secured four seats or groups of seats; on the crown 2 are also secured four seats or groups of seats. These seats or groups of seats can be of any kind and constituted by motor cars, airplanes, various animals, bicycles or any other objects.

The plate 1 and crown 2 constitute the two raceways of the right-hand group, they receive a rotary movement of reverse direction by means of toothed rims 4 and 5, one of which, 4, is rigid with the plate 3 and, consequently, with the crown 2, and the other, 5, is rigid with the plate 1.

The rims 4 and 5 have bevelled teeth and arranged one above the other so that they can be both driven by one and the same bevel pinion 6 rigidly secured to the end of a horizontal shaft 7 receiving a rotary movement.

It has been seen that the toothed rim 4 is rigid with the plate 3 and, consequently, with the raceway 2, and, on the other hand, the toothed rim 5 is rigidly secured at its centre on a vertical shaft 8, the upper end of which extends in a bearing 9 and the lower end rests in a step bearing 10 arranged in the upper part of the roundabout; suitable sleeves and ball bearings ensure the guiding and rotation of the various members.

The plate 3 rests on rollers or rolling wheels, and other rollers or rolling wheels 12 are interposed between the plates 1 and 3.

The left-hand portion of the roundabout partially overlaps the right-hand portion and it is constituted in the same manner as the latter.

In this left-hand portion of the roundabout, the various parts are designated by the same reference numbers as for the right-hand portion, but with the index "a."

The raceways and driving members are inverted and arranged in the upper part of the roundabout; consequently, the seats are hung from these raceways and are flush with the floor of the roundabout, level with the raceways 1 and 2, the vertical shaft being placed as near as possible to the raceway 2.

On the shafts 7 and $7^a$ are rigidly secured pinions 13, $13^a$ of the same dimensions, on which passes a chain 14; consequently, the movement of rotation imparted to the shaft 7 is transmitted to the shaft $7^a$ and both groups of raceways thus move at the same speed.

Use might also be made of a rigid control coupled by bevel pinions.

The arrows shown on the drawings indicate the direction of rotation of the various raceways of the roundabout; it will be noted that the two raceways of one and the same group rotate in reverse direction and also that the two inner raceways of both groups rotate in reverse direction to each other, and the same is true for the outer raceways.

It will be understood that by means of the arrangement adopted the seats of the right-hand group pass between the seats of the left-hand group, and reversely, at the place where both groups of raceways are superposed, thus producing an interlocked or entangled circulation.

The seats of the inner raceways will be given smaller dimensions than those of the outer raceways, for allowing the passage of the said outer raceways between the seats.

It is also to be understood that instead of constituting a roundabout with two groups of raceways, the said roundabout could comprise three groups of raceways or even a greater number.

The raceways can present another shape than the circular shape shown in the drawings; thus they might be elongated, elliptical, in the shape of an 8 or have any other suitable shape allowing the seats of the various raceways to cross each other.

If airplanes are used as seats, care will be taken, for facilitating the crossings, to place the wings at different levels.

The various parts of the roundabout will of course be assembled so that they can be easily taken to pieces.

What I claim as my invention and desire to secure by Letters Patent is:

1. In an amusement apparatus, a plate rotating about a vertical shaft, a second plate also rotating about a vertical shaft different from the preceding one and so arranged that a portion of this second plate is above a portion of the first plate, seats secured on the first plate, seats hung below the second plate so that the path of these seats are in the same plane as the path of the seats of the first plate, means for causing each of the plates to rotate, and means for rendering the movements of the plates dependent on each other and for thus avoiding any possibility of collision at the crossing points of the paths of the seats.

2. In an amusement apparatus, a plate rotating about a shaft, a second plate rotating about a shaft different from the preceding one, seats secured to each of the plates, means for arranging the plates in such a way that the paths of the seats cross each other, means for rendering the movements of the plates dependent on each other and for thus avoiding any possibility of collision at the crossing points of both paths.

3. In an amusement apparatus, a plate rotating about a shaft, a second plate rotating about a shaft different from the preceding one, seats secured to each of the plates, means for arranging the plates in such a way that the paths of the seats cross each other, common actuating means for both plates for rendering the movements of these plates dependent on each other and thus avoiding any possibility of collision at the crossing points of both paths.

4. In an amusement apparatus, a plate rotating about a shaft, a second plate rotating in reverse direction about a shaft different from the preceding one, seats secured to each of the plates, means for arranging the plates in such a way that the paths of the seats cross each other, common actuating means for both plates, for rendering the movements of these plates dependent on each other and thus avoiding any possibility of collision at the crossing points of both paths.

5. In an amusement apparatus, a plurality of movable objects arranged for receiving passengers, means for causing a portion of these movable objects to move in a certain direction on a definite path, means for causing a second portion of these movable objects to move in reverse direction to the preceding one on a path concentric with the first one, means for causing a third portion of these movable objects to move, in a certain direction, on a third path arranged for crossing the two first ones, means for causing the remainder of these movable objects to move, in a direction reverse to the third one, on a fourth path concentric with the third one and also arranged for crossing the two first paths, and means for rendering the movements of the movable objects dependent on each other on each of their paths and for thus avoiding any possibility of collision at the crossing points of the paths.

In testimony whereof I have signed this specification.

ROBERT RAPEIN.